(12) United States Patent
Takagi et al.

(10) Patent No.: US 11,319,694 B2
(45) Date of Patent: May 3, 2022

(54) ELECTRIC CONSTRUCTION MACHINE

(71) Applicant: Hitachi Construction Machinery Tierra Co., Ltd., Koka (JP)

(72) Inventors: Wataru Takagi, Kusatsu (JP); Masayuki Yunoue, Koka (JP); Takuya Nomura, Rittou (JP); Yuki Hirose, Rittou (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 270 days.

(21) Appl. No.: 16/645,719

(22) PCT Filed: Sep. 28, 2018

(86) PCT No.: PCT/JP2018/036515
§ 371 (c)(1),
(2) Date: Mar. 9, 2020

(87) PCT Pub. No.: WO2020/065994
PCT Pub. Date: Apr. 2, 2020

(65) Prior Publication Data
US 2021/0222404 A1 Jul. 22, 2021

(51) Int. Cl.
*E02F 9/26* (2006.01)
*B60L 50/60* (2019.01)
(Continued)

(52) U.S. Cl.
CPC .................. *E02F 9/26* (2013.01);
*B60L 3/12* (2013.01); *B60L 50/60* (2019.02);
*E02F 9/22* (2013.01);
(Continued)

(58) Field of Classification Search
CPC . E02F 9/207; E02F 9/2095; E02F 9/22; E02F 9/2253; E02F 9/2285; E02F 9/2292;
(Continued)

(56) References Cited

U.S. PATENT DOCUMENTS 9,745,723 B2* 8/2017 Inoue ............... H02J 7/0047
2011/0178745 A1* 7/2011 Kobayashi ......... G01R 31/3646
702/63
(Continued)

FOREIGN PATENT DOCUMENTS

CN 105904981 A 8/2016
JP 61-132001 A 6/1986
(Continued)

OTHER PUBLICATIONS

International Preliminary Report on Patentability (PCT/IB/338 & PCT/IB/373) issued in PCT Application No. PCT/JP2018/036515 dated Apr. 8, 2021, Including English translation of document C2 (Japanese-language Written Opinion (PCT/ISA/237), filed on Mar. 9, 2020) (five (5) pages).
(Continued)

*Primary Examiner* — Tyler J Lee
(74) *Attorney, Agent, or Firm* — Crowell & Moring LLP

(57) ABSTRACT

An electric construction machine is provided that can travel from a work location to a charging location, and can suppress deterioration of work efficiency.
The electric hydraulic excavator includes: a battery device (19); an electric motor (28) that is driven by power of the battery device (19); a hydraulic pump (29) that is driven by the electric motor (28); a travelling hydraulic motor (7) and a work hydraulic actuator that are driven by a hydraulic fluid delivered from the hydraulic pump (29); a controller (37); and a display device (24). The controller (37) computes an operable time by dividing power storage amount of the battery device (19) by average power consumption per unit time during driving of the electric motor (28); computes a travelable time by dividing the power storage amount of the battery device (19) by average power consumption per unit time during driving of the electric motor (28) and the travelling hydraulic motor (7); and causes the computed
(Continued)

operable time and the computed travelable time to be displayed on the display device (24).

5 Claims, 11 Drawing Sheets

(51) Int. Cl.
  *B60L 3/12* (2006.01)
  *E02F 9/22* (2006.01)
(52) U.S. Cl.
  CPC ......... *E02F 9/2253* (2013.01); *B60L 2200/40* (2013.01); *B60L 2250/16* (2013.01); *B60L 2260/52* (2013.01); *B60L 2260/54* (2013.01); *E02F 9/2285* (2013.01); *E02F 9/2292* (2013.01); *E02F 9/2296* (2013.01)
(58) Field of Classification Search
  CPC ........... E02F 9/2296; E02F 9/26; E02F 9/267; Y02T 10/70; Y02T 10/7072; Y02T 90/12; Y02T 90/16; B60L 2200/40; B60L 2250/16; B60L 2260/52; B60L 2260/54; B60L 3/12; B60L 50/60; B60K 6/22
  See application file for complete search history.

(56) References Cited

U.S. PATENT DOCUMENTS

2013/0311016 A1  11/2013  Kim
2014/0147238 A1  5/2014  Izumi et al.
2016/0083932 A1* 3/2016  Inoue ................... E02F 9/2091
                                                     701/22

FOREIGN PATENT DOCUMENTS

| JP | 10-77872 A | 3/1998 |
| JP | 10-317428 A | 12/1998 |
| JP | 2008-189215 A | 8/2008 |
| JP | 2010-37011 A | 2/2010 |
| JP | 2013-68020 A | 4/2013 |
| JP | 2013-75562 A | 4/2013 |
| JP | 2015-182857 A | 10/2015 |
| WO | WO 2007/105462 A1 | 9/2007 |

OTHER PUBLICATIONS

English translation of document C1 (International Search Report (PCT/ISA/210) issued in PCT Application No. PCT/JP2018/036515 dated Dec. 25, 2018) (one page).
Extended European Search Report issued in European Application No. 18932313.2 dated Apr. 7, 2021 (10 pages).
International Search Report (PCT/ISA/210) issued in PCT Application No. PCT/JP2018/036515 dated Dec. 25, 2018 (three (3) pages).
Japanese-language Written Opinion (PCT/ISA/237) issued in PCT Application No. PCT/JP2018/036515 dated Dec. 25, 2018 (three (3) pages).
Korean-language Office Action issued in Korean Application No. 10-2020-7006311 dated Sep. 27, 2021 (five (5) pages).

* cited by examiner

FIG. 12
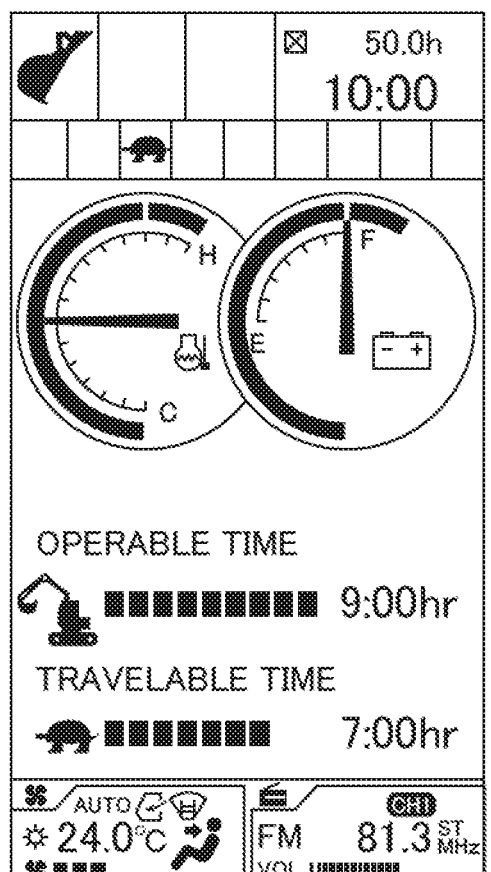
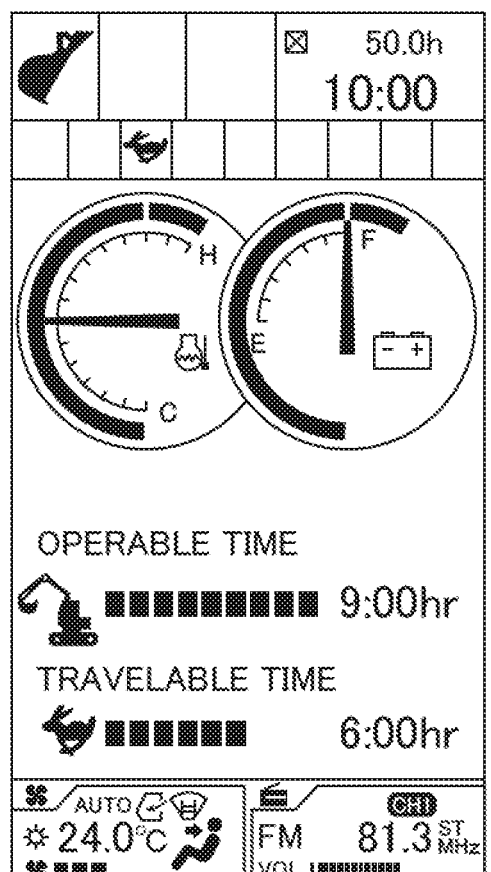

ELECTRIC CONSTRUCTION MACHINE

TECHNICAL FIELD

The present invention relates to an electric construction machine including a power storage device and an electric motor that is driven by power of the power storage device and drives a hydraulic pump.

BACKGROUND ART

Construction machines such as hydraulic excavators include a hydraulic pump, and a plurality of hydraulic actuators (specifically, travelling hydraulic motors and work hydraulic motors) that are driven by a hydraulic fluid delivered from the hydraulic pump. Engine-driven construction machines include a fuel tank that retains fuel, and an engine driven by the fuel in the fuel tank, and are configured to drive a hydraulic pump by the engine. In the known engine-driven construction machines, an operable time (in other words, a length of time over which an engine can be driven) of the construction machine is computed on the basis of an amount of fuel in a fuel tank, and the computed operable time is displayed (see Patent Document 1, for example).

PRIOR ART DOCUMENT

Patent Document

Patent Document 1: JP-1998-077872-A

SUMMARY OF THE INVENTION

Problem to be Solved by the Invention

In recent years, electric construction machines including a power storage device, and an electric motor that is driven by power of the power storage device are proposed. Such electric construction machines are configured to drive a hydraulic pump by the electric motor. Electric construction machines have to make round trips between a work location and a charging location for charging a power storage device in some cases. Explaining specifically, for example, even if a charging vehicle equipped with a charging apparatus for charging a power storage device is made ready for use, this charging vehicle cannot approach a work location in some cases. Alternatively, for example, charging facilities for charging a power storage device are far from a work location in some cases. In such a case, an electric construction machine has its power storage device charged at a charging location (i.e. a location where there is/are a charging vehicle or charging facilities), and then travels to a work location to operate at the work location. Then, the electric construction machine has to return from the work location to the charging location when the power storage amount of the power storage device becomes small.

In view of this, for example, in one possible method, average power consumption per unit time is computed on the basis of the power consumption amount of an electric motor that has been consumed when a construction machine has operated at a work location, an operable time of the construction machine is computed by dividing the power storage amount of a power storage device by the average power consumption, and the computed operable time is displayed. On the basis of the operable time computed and displayed by this method, an operator determines the timing for the construction machine to return from a work location to a charging location.

However, typically, the load on a travelling hydraulic motor is higher than the load on a work hydraulic actuator. Accordingly, the power consumption amount of an electric motor consumed at the time of travelling of a construction machine is larger than the power consumption amount of the electric motor consumed at the time of work of the construction machine. For such a reason, on the basis of the operable time computed and displayed in the method mentioned above, the operator has to make a longer estimate of an operable time (in other words, a travelable time) corresponding to the power storage amount of the power storage device required for the construction machine to travel from the work location to the charging location. Then, if an estimate of the travelable time made by the operator is not sufficient, the construction machine cannot travel from the work location to the charging location. On the other hand, if an estimate of the travelable time made by the operator is longer than necessary, the work efficiency of the construction machine deteriorates.

The present invention has been made in view of the matters that are explained above, and an object thereof is to provide an electric construction machine that can travel from a work location to a charging location, and additionally suppress deterioration of work efficiency.

Means for Solving the Problem

In order to achieve the object, the present invention provides a construction machine including: a power storage device; an electric motor that is driven by power of the power storage device; a hydraulic pump that is driven by the electric motor; a travelling hydraulic motor and a work hydraulic actuator that are driven by a hydraulic fluid delivered from the hydraulic pump; a controller; and a display device. In the construction machine, the controller is configured to: compute an operable time by dividing a power storage amount of the power storage device by average power consumption per unit time during driving of the electric motor; compute a travelable time by dividing the power storage amount of the power storage device by average power consumption per unit time during driving of the electric motor and the travelling hydraulic motor; and cause the computed operable time and the computed travelable time to be displayed on the display device.

Advantages of the Invention

According to the present invention, it is possible to travel from a work location to a charging location, and additionally suppress deterioration of work efficiency.

BRIEF DESCRIPTION OF THE DRAWINGS

FIG. 12 is a view representing a specific example of the screen of the display device in the second embodiment of the present invention.

MODES FOR CARRYING OUT THE INVENTION

Hereinafter, an electric hydraulic excavator is mentioned as an example of targets to which the present invention is applied, and a first embodiment of the present invention is explained with reference to the drawings.

Figure 1:
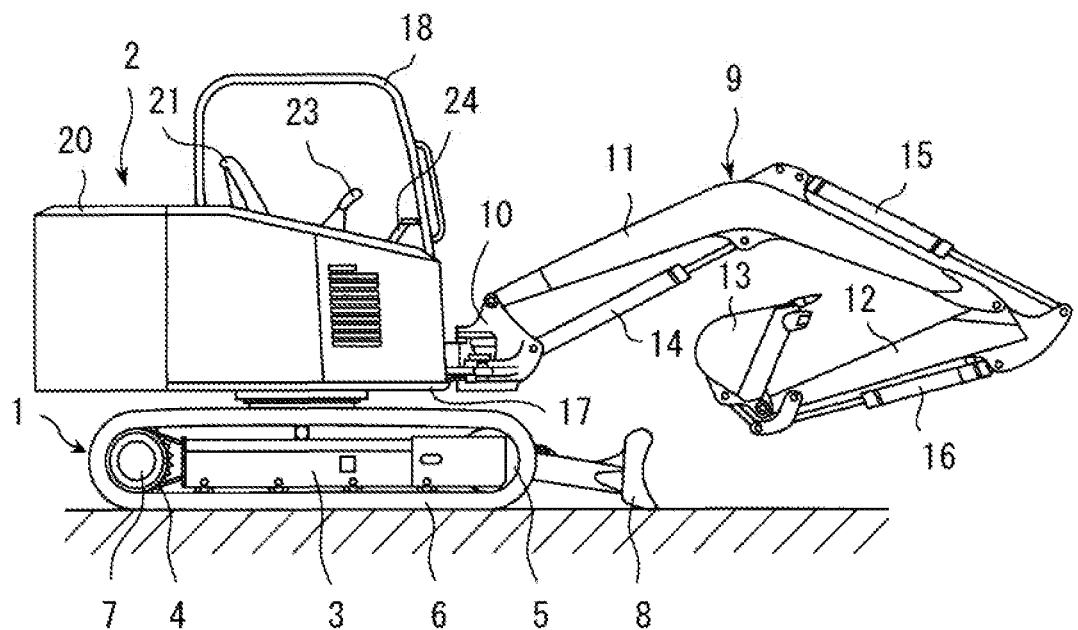
FIG. 1 is a lateral view representing the structure of an electric hydraulic excavator in a first embodiment of the present invention.
Figure 2:
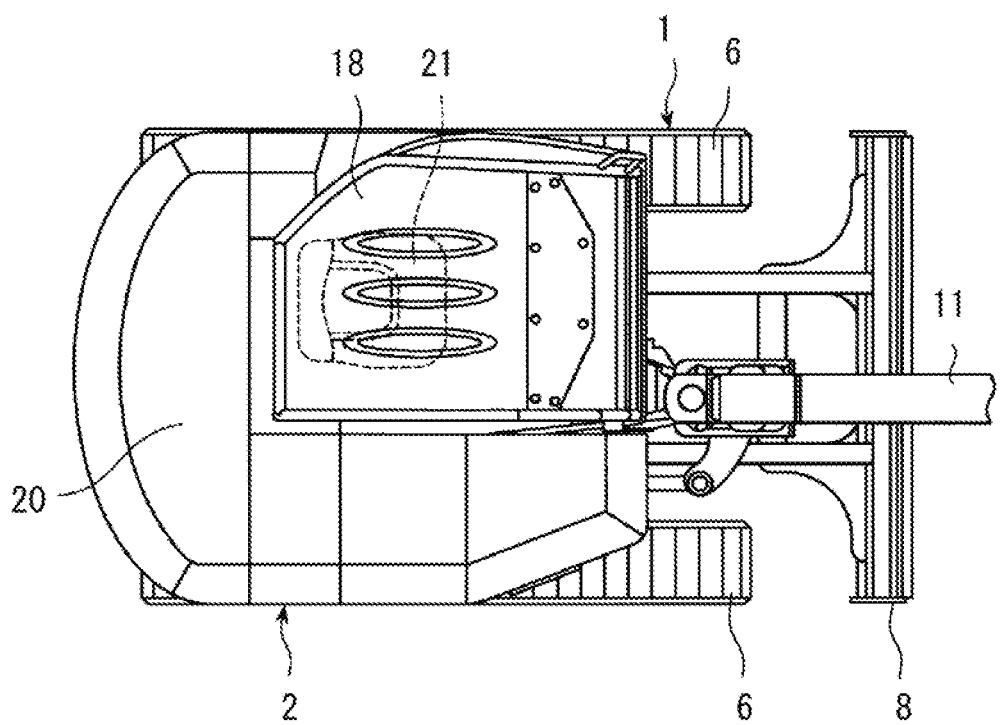
FIG. 2 is a top view representing the structure of the electric hydraulic excavator in the first embodiment of the present invention.

FIG. 1 and FIG. 2 are a lateral view and a top view representing the structure of an electric hydraulic excavator in the present embodiment. Note that, hereinafter, the front side (the right side in FIG. 1 and FIG. 2), the rear side (the left side in FIG. 1 and FIG. 2), the right side (the bottom side in FIG. 2), and the left side (the top side in FIG. 2) as seen from an operator in a case in which the operator is seated on the operator's seat in the state of the electric hydraulic excavator as illustrated in FIG. 1 and FIG. 2 are simply referred to as the front side, the rear side, the right side and the left side.

The electric hydraulic excavator of the present embodiment is a mini-excavator having a machine mass of smaller than 6000 kg. This electric hydraulic excavator includes a lower track structure 1 that can travel by itself, and an upper swing structure 2 that is provided swingably on the top side of the lower track structure 1. The lower track structure 1 and the upper swing structure 2 constitute the machine-body. The upper swing structure 2 is caused to swing by a swing hydraulic motor (not illustrated).

The lower track structure 1 includes a track frame 3 which is H-shaped when seen from above. The right side of the track frame 3 is provided with a driving wheel 4 and an idler wheel 5, and a right crawler (crawler) 6 is wound around and between the driving wheel 4 and the idler wheel 5. The right driving wheel 4 is rotated by a right travelling hydraulic motor 7 to thereby drive the right crawler 6. The left side of the track frame 3 is also provided with a driving wheel and an idler wheel, and a left crawler 6 is wound around and between the driving wheel and the idler wheel. The left driving wheel is rotated by a left travelling hydraulic motor (not illustrated) to thereby drive the left crawler 6.

The front side of the track frame 3 is provided with a blade 8 for earth removal in a vertically movable manner. The blade 8 is moved up and down by a blade hydraulic cylinder (not illustrated).

The front side of the upper swing structure 2 is coupled with a work implement 9. The work implement 9 includes: a swing post 10 that is coupled to the front side of the upper swing structure 2 (specifically, a swing frame 17 mentioned below) pivotably in the left and right directions; a boom 11 that is coupled to the swing post 10 pivotably in the upward and downward directions; an arm 12 that is coupled to the boom 11 pivotably in the upward and downward directions; and a bucket 13 that is coupled to the arm 12 pivotably in the upward and downward directions. The swing post 10, the boom 11, the arm 12 and the bucket 13 are caused to pivot by a swing hydraulic cylinder (not illustrated), a boom hydraulic cylinder 14, an arm hydraulic cylinder 15 and a bucket hydraulic cylinder 16, respectively.

The upper swing structure 2 includes: the swing frame 17 forming a base structure; a canopy-type operation room 18 provided on the left side of the swing frame 17; and a battery-mounting section 20 that is provided on the rear side of the swing frame 17, and houses a battery device 19 (see FIG. 3 and FIG. 4 mentioned below).

In the operation room 18, an operator's seat 21 on which an operator is to be seated is provided. The front side of the operator's seat 21 is provided with a right travelling operation member 22 (see FIG. 3 mentioned below) and a left travelling operation member (not illustrated). Each of the travelling operation members is formed by integrating an operation pedal and an operation lever, and is used for giving an instruction on travelling operation of the lower track structure 1 when operated in the forward and backward directions. On the right side of the travelling operation member 22, there is provided with a swing operation pedal (not illustrated). The swing operation pedal is used for giving an instruction on operation of the swing post 10 when operated in the left and right directions.

On the right side of the operator's seat 21, a work operation lever 23 and a blade operation lever (not illustrated) are provided. The right work operation lever 23 is used for giving an instruction on operation of the boom 11 when operated in the forward and backward directions, and is used for giving an instruction on operation of the bucket 13 when operated in the left and right directions. The blade operation lever is used for giving an instruction on operation of the blade 8 when operated in the forward and backward directions. On the left side of the operator's seat 21, a work operation lever (not illustrated) is provided. The left work operation lever is used for giving an instruction on operation of the arm 12 when operated in the forward and backward directions, and is used for giving an instruction on swing operation of the upper swing structure 2 when operated in the left and right directions.

In the operation room 18, a display device 24 and a start/stop switch 26 (see FIG. 4 mentioned below) are provided.

The lower track structure 1, the upper swing structure 2, the blade 8, the swing post 10, the boom 11, the arm 12 and the bucket 13 mentioned above constitute a driven body to be driven by a drive system mounted on the electric hydraulic excavator. FIG. 3 is a diagram representing a configuration related to driving of the right travelling hydraulic motor 7 as a representative of the travelling hydraulic motors, and a configuration related to driving of the boom hydraulic cylinder 14 as a representative of the work hydraulic actuators, among configurations of the drive system in the present embodiment.

The drive system of the present embodiment includes: the battery device 19 (power storage device); an electric motor 28 that is driven by being supplied with power of the battery device 19 via an inverter device 27; a hydraulic pump 29 and a pilot pump 30 that are driven by the electric motor 28; a travelling control valve 31 that controls the flow of a hydraulic fluid from the hydraulic pump 29 to the travelling hydraulic motor 7; a travelling operation device 32 that switches the travelling control valve 31; a boom control valve 33 that controls the flow of the hydraulic fluid from the hydraulic pump 29 to the boom hydraulic cylinder 14; and a work operation device 34 that switches the boom control valve 33.

The travelling operation device 32 includes: the travelling operation member 22 mentioned above; a first pressure-reducing valve (not illustrated) that is actuated depending on forward operation of the travelling operation member 22; and a second pressure-reducing valve (not illustrated) that is actuated depending on backward operation of the travelling operation member 22. The first pressure-reducing valve generates a pilot pressure corresponding to a forward operation amount of the travelling operation member 22 by using a delivery pressure of the pilot pump 30 as the source pressure, and outputs the generated pilot pressure to a pressure-receiving section on the right side of the travelling control valve 31 in FIG. 3 via a pilot line. Thereby, the travelling control valve 31 is switched to a switching position on the right side in FIG. 3 to rotate the travelling hydraulic motor 7 in the forward direction.

Figure 3:
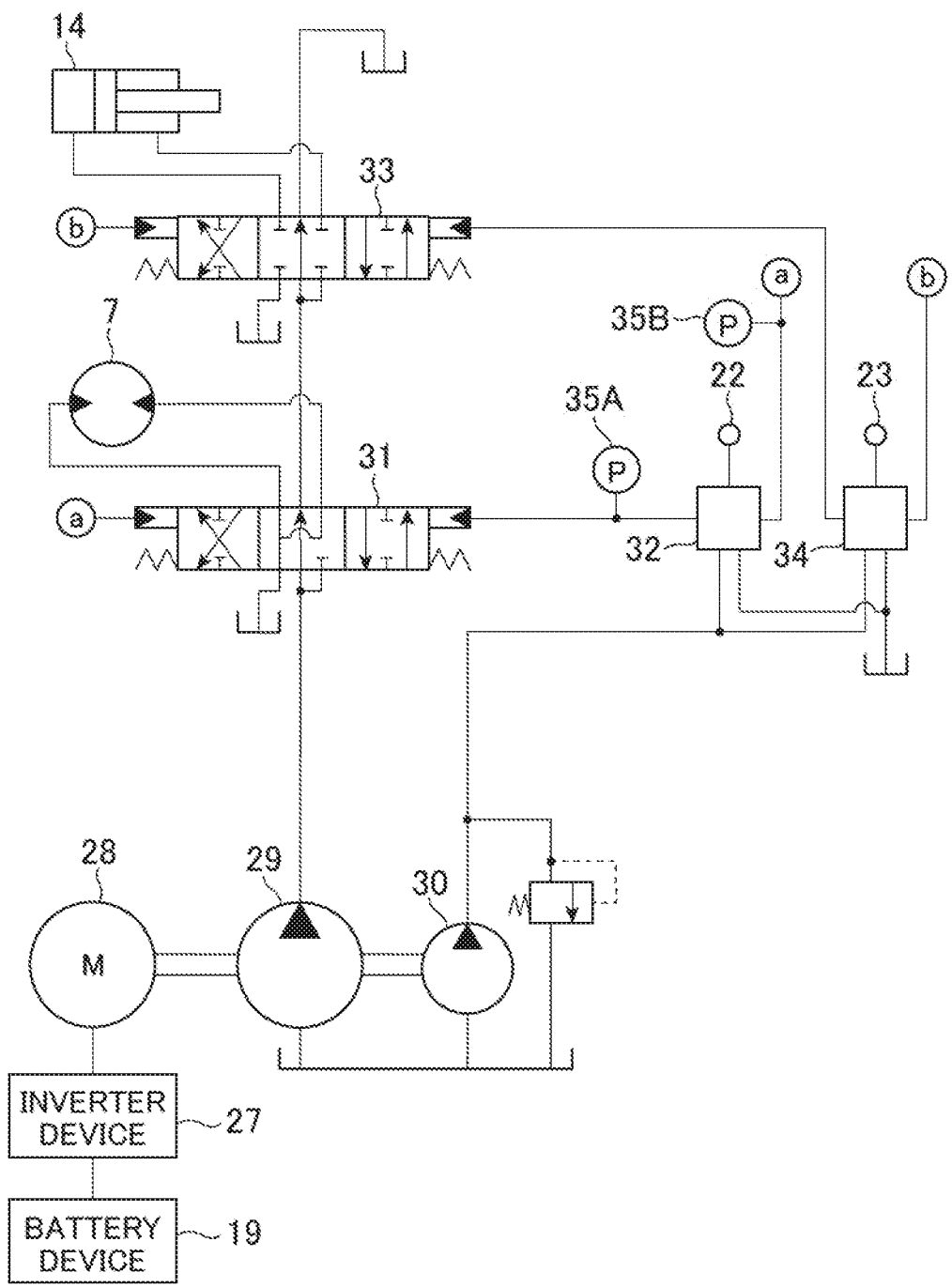
FIG. 3 is a diagram representing the configuration of a drive system in the first embodiment of the present invention.
Figure 4:
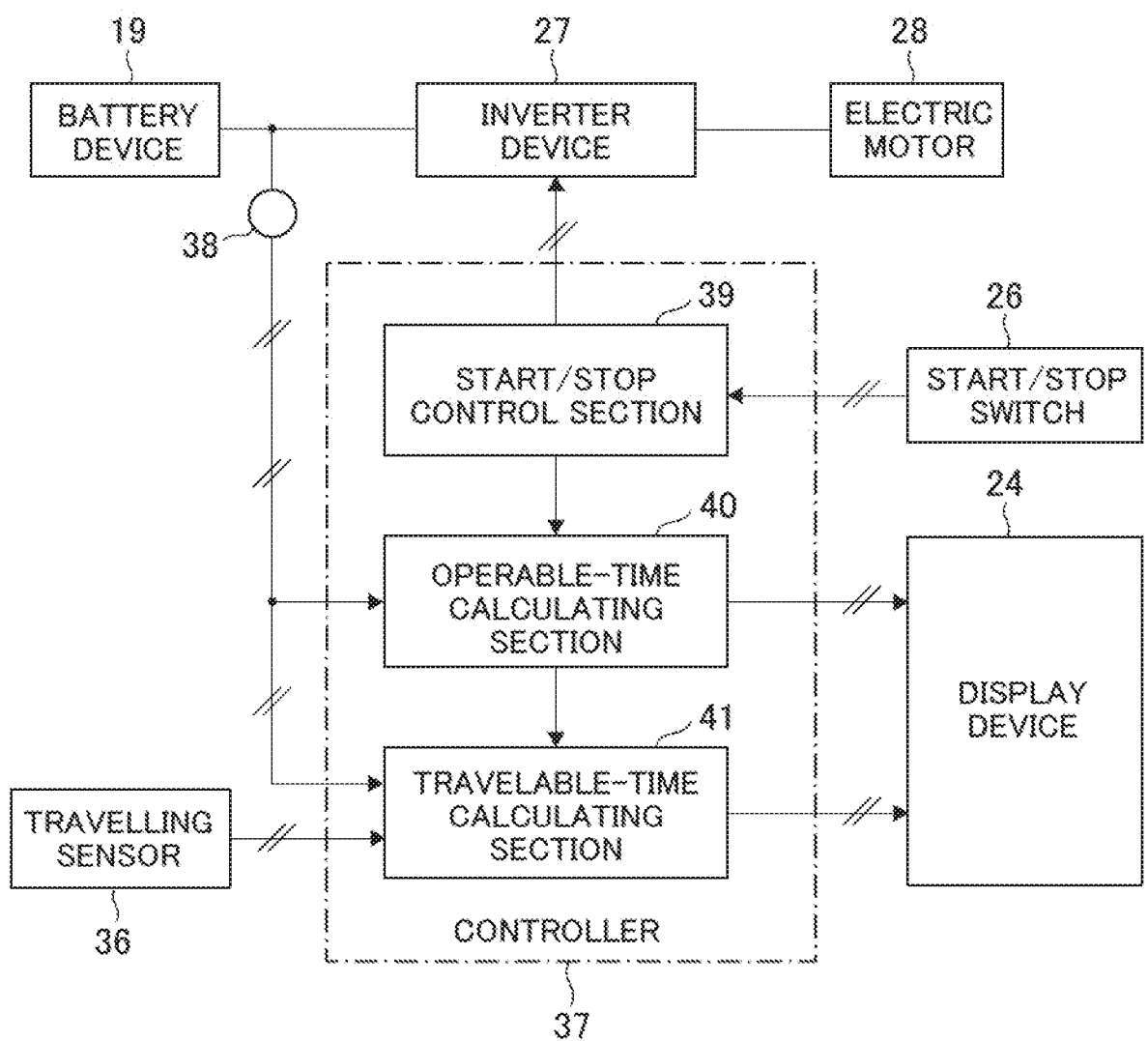
FIG. 4 is a diagram representing the functional configuration of a controller in the first embodiment of the present invention along with related equipment.

The second pressure-reducing valve generates a pilot pressure corresponding to a backward operation amount of the travelling operation member 22 by using a delivery pressure of the pilot pump 30 as the source pressure, and outputs the generated pilot pressure to a pressure-receiving section on the left side of the travelling control valve 31 in FIG. 3 via a pilot line. Thereby, the travelling control valve 31 is switched to a switching position on the left side in FIG. 3 to rotate the travelling hydraulic motor 7 in the backward direction.

The work operation device 34 includes: the work operation lever 23 mentioned above; a third pressure-reducing valve (not illustrated) that is actuated depending on forward operation of the work operation lever 23; and a fourth pressure-reducing valve (not illustrated) that is actuated depending on backward operation of the work operation lever 23. The third pressure-reducing valve generates a pilot pressure corresponding to a forward operation amount of the work operation lever 23 by using a delivery pressure of the pilot pump 30 as the source pressure, and outputs the generated pilot pressure to a pressure-receiving section on the right side of the boom control valve 33 in FIG. 3 via a pilot line. Thereby, the boom control valve 33 is switched to a switching position on the right side in FIG. 3 to contract the boom hydraulic cylinder 14.

The fourth pressure-reducing valve generates a pilot pressure corresponding to a backward operation amount of the work operation lever 23 by using a delivery pressure of the pilot pump 30 as the source pressure, and outputs the generated pilot pressure to a pressure-receiving section on the left side of the boom control valve 33 in FIG. 3 via a pilot line. Thereby, the boom control valve 33 is switched to a switching position on the left side in FIG. 3 to extend the boom hydraulic cylinder.

Note that configurations related to driving of the left travelling hydraulic motor and the other work hydraulic actuators (specifically, the swing hydraulic motor, the blade hydraulic cylinder, the swing hydraulic cylinder, the arm hydraulic cylinder 15 and the bucket hydraulic cylinder 16) are almost the same as the configurations related to driving of the right travelling hydraulic motor 7 and the boom hydraulic cylinder 14.

The two pilot lines related to driving of the right travelling hydraulic motor 7 are provided with pressure sensors 35A and 35B, respectively. Although not illustrated, two pilot lines related to driving of the left travelling hydraulic motor are also provided with two pressure sensors, respectively. Then, a shuttle valve (not illustrated) that selects and outputs the highest value of pilot pressures sensed at the pressure sensors 35A and 35B and the two pressure sensors is provided. These pressure sensors and the shuttle valve constitute a travelling sensor 36 (see FIG. 4 mentioned below) that senses operation of travelling of the lower track structure 1.

Meanwhile, the electric hydraulic excavator mentioned above has to make round trips between a work location and a charging location for charging the battery device 19 in some cases. In view of this, a controller 37 of the electric hydraulic excavator of the present embodiment computes not only the power storage amount of the battery device 19 and an operable time of the hydraulic excavator, but also a travelable time of the hydraulic excavator, and causes the power storage amount, the operable time and the travelable time to be displayed on the display device 24. The controller 37 and related equipment of the present embodiment are explained by using FIG. 4. FIG. 4 is a diagram representing the functional configuration of the controller in the present embodiment along with the related equipment.

An electric-current sensor 38 is provided between the battery device 19 and the inverter device 27, and supplied electric current of the battery device 19 (in other words, electric-current consumption of the electric motor 28) sensed at the electric-current sensor 38 is output to the controller 37 every millisecond, for example. The start/stop switch 26 is constituted by a push switch, for example, through which an instruction on starting or stopping the electric motor 28 is input.

The controller 37 has: a calculation control section (e.g. a CPU) that executes a calculation process and a control process on the basis of a program; a storage section (e.g. a ROM or a RAM) that stores the program and a result of the calculation process; and the like. The controller 37 has a start/stop control section 39, an operable-time calculating section 40 and a travelable-time calculating section 41 as its functional configurations.

The start/stop control section 39 of the controller 37 controls the inverter device 27 depending on an input through the start/stop switch 26, and thereby controls start/stop of the electric motor 28.

The operable-time calculating section 40 of the controller 37 computes the power storage amount of the battery device 19 on the basis of a result of sensing by the electric-current sensor 38. In addition, the operable-time calculating section 40 computes an operable time by dividing the computed power storage amount of the battery device 19 by average power consumption per unit time during operation of the hydraulic excavator (in other words, during driving of the electric motor 28).

The travelable-time calculating section 41 of the controller 37 computes a travelable time by dividing the power storage amount of the battery device 19 computed at the operable-time calculating section 40 by average power consumption per unit time during travelling of the hydraulic excavator (in other words, during driving of the electric motor 28 and the travelling hydraulic motor).

Figure 5:
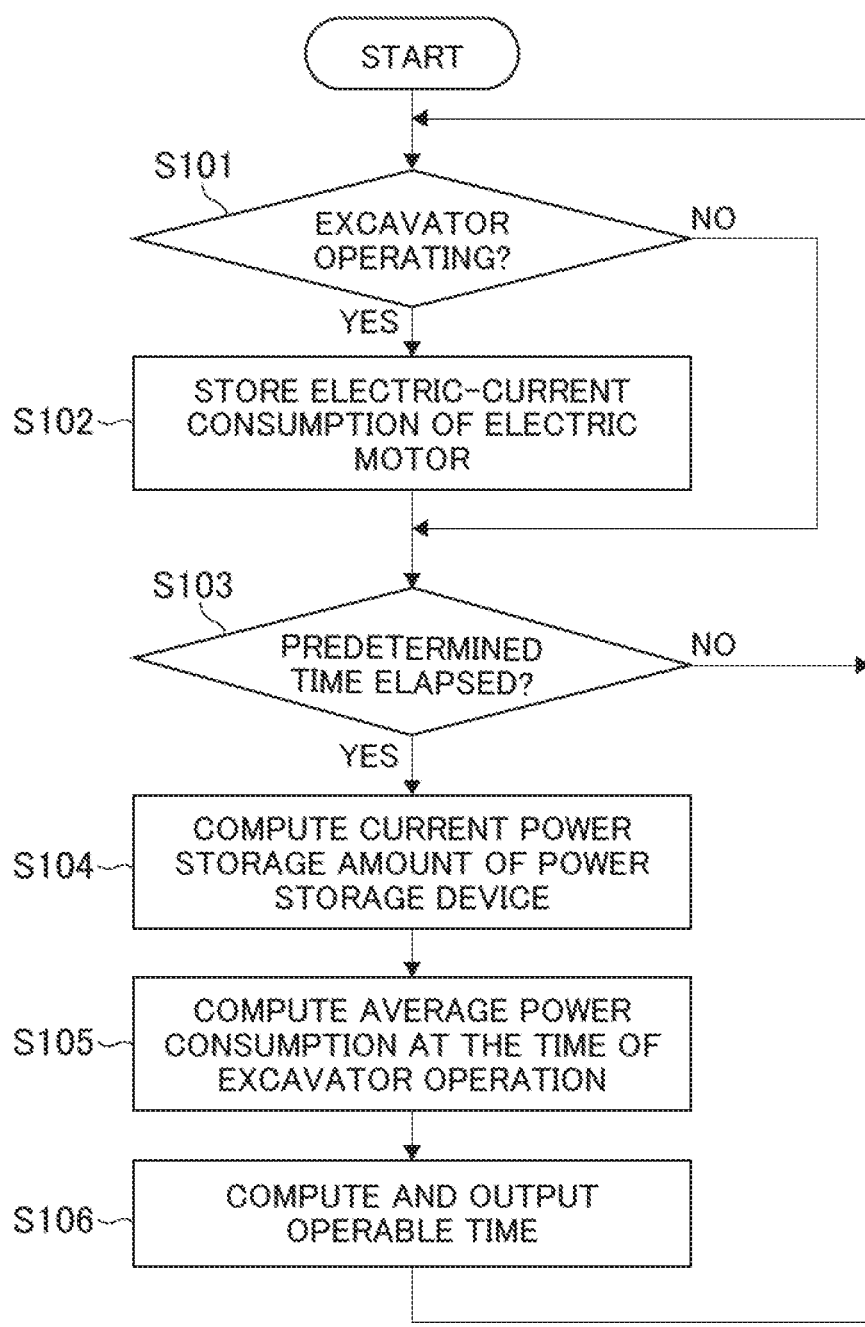
FIG. 5 is a flowchart representing a process of an operable-time calculating section of the controller in the first embodiment of the present invention.

Next, each process of the controller 37 of the present embodiment is explained. FIG. 5 is a flowchart representing a process of the operable-time calculating section of the controller in the present embodiment.

At Step S101, the operable-time calculating section 40 of the controller 37 decides whether or not the electric motor 28 is being driven (in other words, whether or not the hydraulic excavator is in operation) on the basis of control information of the start/stop control section 39. In a case in which the electric motor 28 is being driven (in other words, in a case in which the hydraulic excavator is in operation), the process proceeds to Step S102, and the operable-time calculating section 40 stores electric-current consumption of the electric motor 28 sensed at the electric-current sensor 38. That is, the operable-time calculating section 40 stores a first history of electric-current consumption of the electric motor 28 sensed at the electric-current sensor 38 during driving of the electric motor 28 (in other words, during operation of the hydraulic excavator). The maximum number of pieces of the stored data is set to the number of pieces of data sensed while the hydraulic excavator is in operation for a predetermined length of time t1 (e.g. 10 minutes). The operable-time calculating section 40 is configured to delete the oldest piece of the stored data in a case in which the number of the pieces of the stored data exceeds the maximum number.

After Step S102, the process proceeds to Step S103. At Step S101, in a case in which the electric motor 28 is not being driven (in other words, in a case in which the hydraulic excavator is not in operation), the process skips Step S102, and proceeds to Step S103. At Step S103, according to a timer, the operable-time calculating section 40 of the controller 37 decides whether or not a predetermined length of time t2 which is set in advance (t2<t1; for example, 1 second) has elapsed. If the predetermined length of time t2 has not elapsed, the operable-time calculating section 40 continues counting with the timer, and returns to Step S101 to repeat the same procedures as those explained above. If the predetermined length of time t2 has elapsed, the operable-time calculating section 40 resets the timer, and proceeds to Steps S104 and S105.

Figure 7:
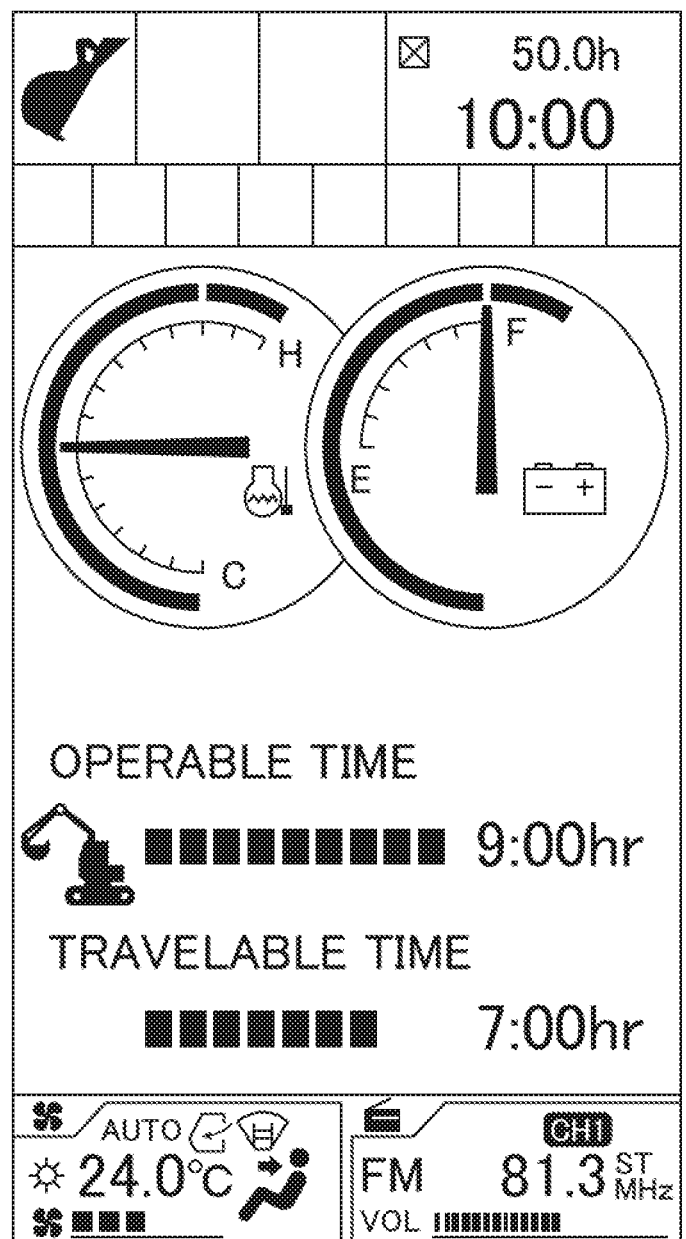
FIG. 7 is a view representing a specific example of a screen of a display device in the first embodiment of the present invention.

At Step S104, the operable-time calculating section 40 of the controller 37 computes the current power storage amount of the battery device 19 on the basis of the first history of the electric-current consumption mentioned above of the electric motor 28. Specifically, the operable-time calculating section 40 computes a power consumption amount of the electric motor 28 by adding up electric-current consumption of the electric motor 28 during the latest predetermined length of time t2 in the electric-current consumption of the electric motor 28 stored as the first history. Then, the operable-time calculating section 40 computes the current power storage amount by subtracting the power consumption amount mentioned before from a power storage amount in the past (before the lapse of the predetermined length of time t2) of the battery device 19. Then, the operable-time calculating section 40 outputs the computed current power storage amount of the battery device 19 to the display device 24 to be displayed thereon. The display device 24 displays the power storage amount by the position of a pointer between scale marks on a screen 25 illustrated in FIG. 7, for example.

At Step S105, the operable-time calculating section 40 of the controller 37 computes average power consumption per unit time during driving of the electric motor 28 (in other words, during operation of the hydraulic excavator) on the basis of the first history of the electric-current consumption mentioned above of the electric motor 28. Specifically, the operable-time calculating section 40 computes a power consumption amount of the electric motor 28 by adding up electric-current consumption of the electric motor 28 stored as the first history. Then, the operable-time calculating section 40 computes average power consumption per unit time during driving of the electric motor 28 (in other words, during operation of the hydraulic excavator) by dividing the power consumption amount mentioned before by the predetermined length of time t1. Then, the process proceeds to Step S106, and the operable-time calculating section 40 computes an operable time by dividing the current power storage amount of the battery device 19 by the average power consumption mentioned before. Then, the operable-time calculating section 40 outputs the computed operable time to the display device 24 to be displayed thereon. The display device 24 displays the operable time (numerical value) on the screen 25 illustrated in FIG. 7, for example.

Figure 6:
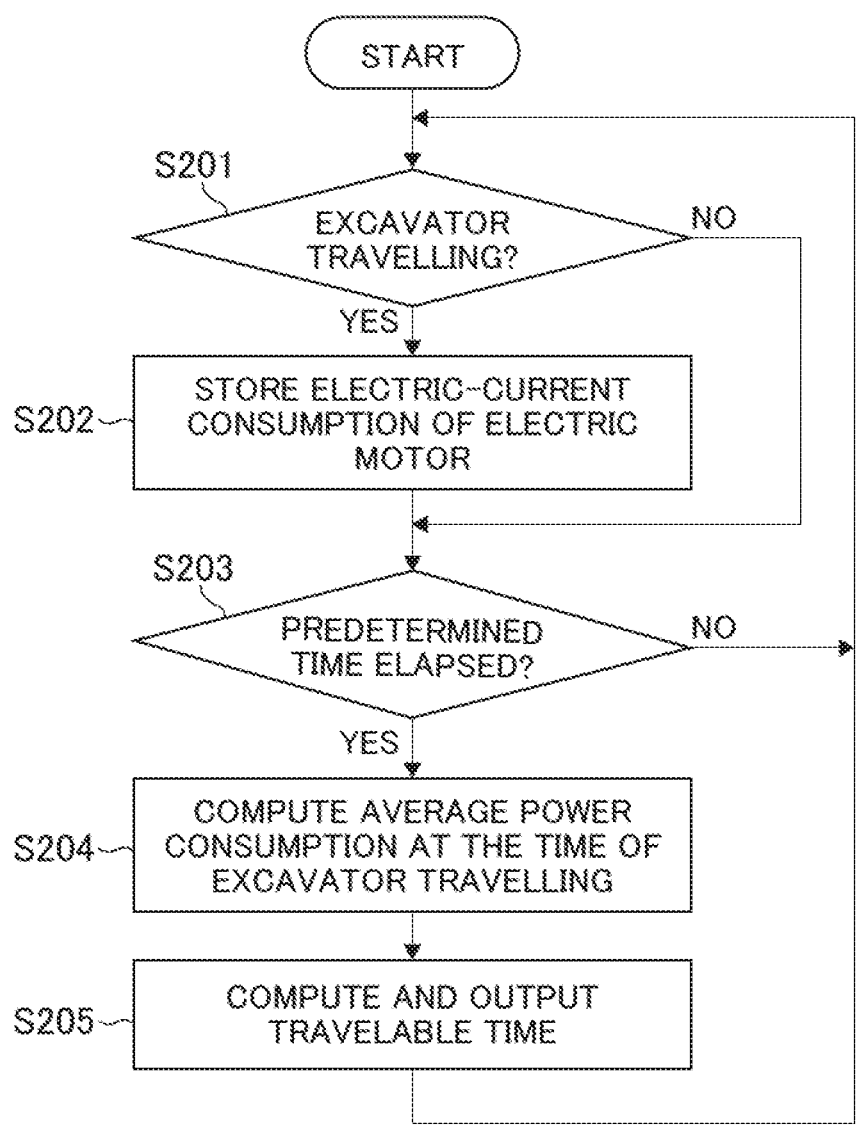
FIG. 6 is a flowchart representing a process of a travelable-time calculating section of the controller in the first embodiment of the present invention.

FIG. 6 is a flowchart representing a process of the travelable-time calculating section of the controller in the present embodiment.

At Step S201, the travelable-time calculating section 41 of the controller 37 decides whether or not the electric motor 28 and the travelling hydraulic motor are being driven (in other words, whether or not the hydraulic excavator is travelling) on the basis of a result of sensing by the travelling sensor 36. Explaining specifically, in a case in which a pilot pressure obtained at the travelling sensor 36 is equal to or higher than a predetermined threshold, the travelable-time calculating section 41 decides that the electric motor 28 and the travelling hydraulic motor are being driven (in other words, the hydraulic excavator is travelling). In this case, the process proceeds to Step S202, and the travelable-time calculating section 41 stores electric-current consumption of the electric motor 28 sensed at the electric-current sensor 38. That is, the travelable-time calculating section 41 stores a second history of electric-current consumption of the electric motor 28 sensed at the electric-current sensor 38 during driving of the electric motor 28 and the travelling motor (in other words, during travelling of the hydraulic excavator). The maximum number of pieces of the stored data is set to the number of pieces of data sensed while the hydraulic excavator is travelling for the predetermined length of time t1. The travelable-time calculating section 41 is configured to delete the oldest piece of the stored data in a case in which the number of the pieces of the stored data exceeds the maximum number.

After Step 202, the process proceeds to Step S203. At Step S201, in a case in which a pilot pressure obtained at the travelling sensor 36 is lower than the predetermined threshold, the travelable-time calculating section 41 decides that the travelling motor is not being driven (in other words, the hydraulic excavator is not travelling). In this case, the process skips Step S202, and proceeds to Step S203. At Step S203, according to the timer, the travelable-time calculating section 41 of the controller 37 decides whether or not the predetermined length of time t2 has elapsed. If the predetermined length of time t2 has not elapsed, the travelable-time calculating section 41 continues counting with the timer, and returns to Step S201 to repeat the same procedures as those explained above. If the predetermined length of time t2 has elapsed, the travelable-time calculating section 41 resets the timer, and proceeds to S204.

At Step S204, the travelable-time calculating section 41 of the controller 37 computes average power consumption per unit time during driving of the electric motor 28 and the travelling hydraulic motor (in other words, during travelling of the hydraulic excavator) on the basis of the second history of the electric-current consumption mentioned above of the electric motor 28. Specifically, the travelable-time calculating section 41 computes a power consumption amount of the electric motor 28 by adding up electric-current consumption of the electric motor 28 stored as the second history. Then, the travelable-time calculating section 41 computes average power consumption per unit time during driving of the electric motor 28 and the travelling hydraulic motor (in other words, during travelling of the hydraulic excavator) by dividing the power consumption amount mentioned before by the predetermined length of time t1. Then, the process proceeds to Step S205, and the travelable-time calculating section 41 computes a travelable time by dividing the current power storage amount of the battery device 19 by the average power consumption mentioned before. Then, the travelable-time calculating section 41 outputs the computed travelable time to the display device 24 to be displayed thereon. The display device 24 displays the travelable time (numerical value) on the screen 25 illustrated in FIG. 7, for example.

Action and effects of the present embodiment mentioned above are explained. In the present embodiment, not only the power storage amount of the battery device 19 and operable time of the hydraulic excavator, but also a travelable time of the hydraulic excavator is computed, and the power storage amount, the operable time and the travelable time are displayed on the display device 24. Thereby, an operator needs not to estimate the travelable time of the hydraulic excavator on the basis of the power storage amount of the battery device 19 or the operable time of the hydraulic excavator displayed on the display device 24, and only has to pay attention to the travelable time of the hydraulic excavator displayed on the display device 24. Accordingly, the hydraulic excavator can travel from a work location to the charging location. In addition, the operator can consider the timing for charging the battery device 19, that is, the timing for returning from the work location to the charging location, on the basis of a plan of work at the work location, and the operable time and the travelable time that are displayed on the display device 24. Thereby, the operation time of the hydraulic excavator at the work location can be increased, and the work efficiency of the hydraulic excavator can be enhanced.

Note that although in the example explained in the first embodiment, the operable-time calculating section 40 of the controller 37 computes average power consumption per unit time during driving of the electric motor 28 on the basis of the first history of electric-current consumption of the electric motor 28, and uses the average power consumption to compute an operable time, this is not the sole example, and there can be variants within a scope not deviating from the gist and the technical idea of the present invention. For example, average power consumption per unit time during driving of the electric motor 28 may be set in advance, and the operable-time calculating section 40 of the controller 37 may use the average power consumption to compute an operable time.

In addition, although in the example explained in the first embodiment, the travelable-time calculating section 41 of the controller 37 computes average power consumption per unit time during driving of the electric motor 28 and the travelling hydraulic motor on the basis of the second history of electric-current consumption of the electric motor 28, and uses the average power consumption to compute a travelable time, this is not the sole example, and there can be variants within a scope not deviating from the gist and the technical idea of the present invention. For example, average power consumption per unit time during driving of the electric motor 28 and the travelling hydraulic motor may be set in advance, and the travelable-time calculating section 41 of the controller 37 may use the average power consumption to compute a travelable time.

A second embodiment of the present invention is explained by using FIG. 8 to FIG. 12. Note that sections in the present embodiment that are equivalent to corresponding ones in the first embodiment are given the same reference characters, and explanations thereof are omitted as appropriate.

Figure 8:
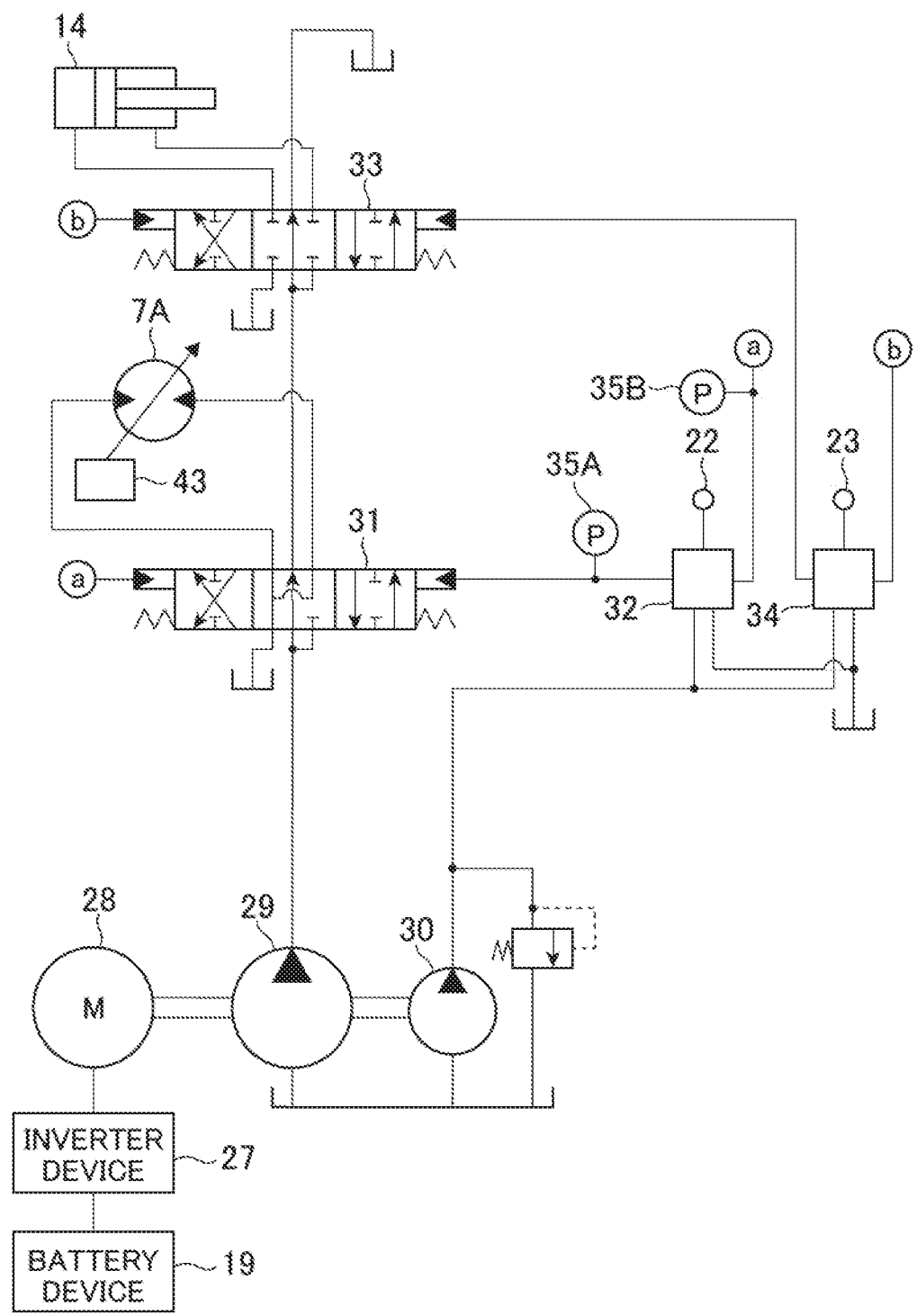
FIG. 8 is a diagram representing the configuration of a drive system in a second embodiment of the present invention.
Figure 9:
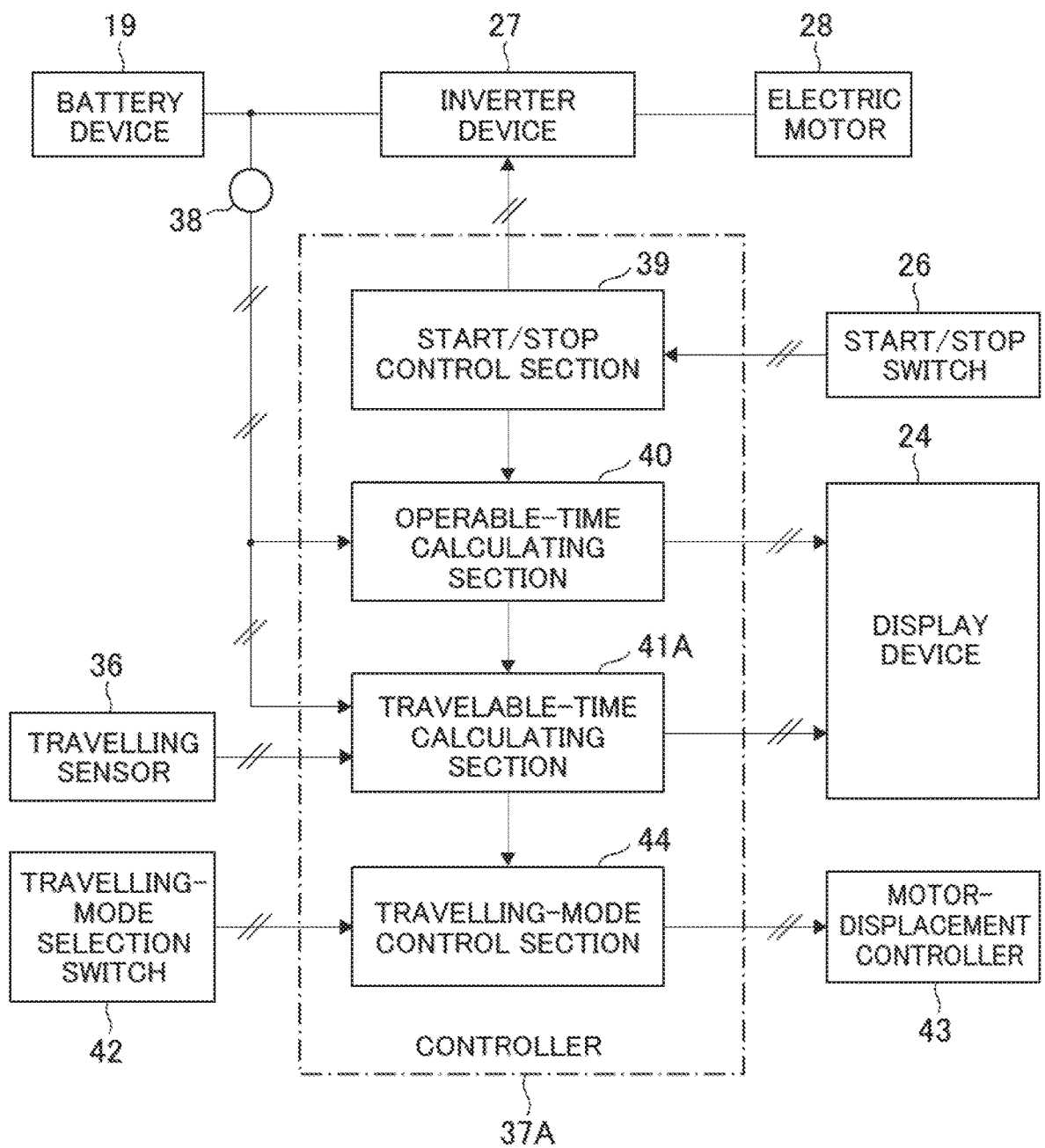
FIG. 9 is a diagram representing the functional configuration of a controller in the second embodiment of the present invention along with related equipment.

FIG. 8 corresponds to FIG. 3 mentioned above, and is a diagram representing the configuration of the drive system in the present embodiment. FIG. 9 corresponds to FIG. 4 mentioned above, and is a diagram representing the functional configuration of the controller in the present embodiment along with related equipment.

In the present embodiment, a travelling-mode selection switch 42 is provided in the cab 18. The travelling-mode selection switch 42 is constituted by a seesaw switch, for example, and an instruction on selecting either a low-speed travelling mode or a high-speed travelling mode is input therethrough.

The right travelling hydraulic motor 7 and the left travelling hydraulic motor are variable-displacement hydraulic motors, and a motor-displacement controller 43 to switch their displacement modes between a large-displacement mode corresponding to the low-speed travelling mode and a small-displacement mode corresponding to the high-speed travelling mode is provided.

Although details are not illustrated, the motor-displacement controller 43 is constituted for example by: a single-acting first hydraulic cylinder that makes the tilting angle of a swash plate of the right travelling hydraulic motor 7 variable; a single-acting second hydraulic cylinder that makes the tilting angle of a swash plate of the left travelling hydraulic motor variable; and a solenoid valve that controls working pressure of the first hydraulic cylinder and the second hydraulic cylinder. When the solenoid valve is not being driven, working chambers of the first hydraulic cylinder and the second hydraulic cylinder communicate with a tank via the solenoid valve. Thereby, the first hydraulic cylinder and the second hydraulic cylinder are contracted, and the right travelling hydraulic motor 7 and the left travelling hydraulic motor are controlled to have large displacements (large-displacement mode). On the other hand, when the solenoid valve is being driven, a hydraulic fluid from the pilot pump 30 is supplied to the working chambers of the first hydraulic cylinder and the second hydraulic cylinder via the solenoid valve. Thereby, the first hydraulic cylinder and the second hydraulic cylinder are extended, and the right travelling hydraulic motor 7 and the left travelling hydraulic motor are controlled to have small displacements (small-displacement mode).

A controller 37A has the start/stop control section 39, the operable-time calculating section 40, a travelable-time calculating section 41A and a travelling-mode control section 44 as its functional configurations. The start/stop control section 39 and the operable-time calculating section 40 are the same as those in the first embodiment.

The travelling-mode control section 44 of the controller 37A controls the motor-displacement controller 43 on the basis of an input through the travelling-mode selection switch 42. In a case in which the low-speed travelling mode is selected at the travelling-mode selection switch 42, the travelling-mode control section 44 controls the motor-displacement controller 43 to set the displacement mode of the travelling hydraulic motor to the large-displacement mode. On the other hand, in a case in which the high-speed travelling mode is selected at the travelling-mode selection switch 42, the travelling-mode control section 44 decides whether or not the power storage amount of the battery device 19 is equal to or larger than a predetermined value. Then, if the power storage amount of the battery device 19 is equal to or larger than the predetermined value, the travelling-mode control section 44 controls the motor-displacement controller 43 to set the displacement mode of the travelling hydraulic motor to the small-displacement mode.

The travelable-time calculating section 41A of the controller 37A executes one process of computing a low-speed travelable time by dividing the power storage amount of the battery device 19 computed at the operable-time calculating section 40 by average power consumption per unit time during low-speed travelling of the hydraulic excavator (in other words, in a case in which the electric motor 28 and the travelling hydraulic motor are being driven, and in which the displacement mode of the travelling hydraulic motor is the large-displacement mode). In addition, the travelable-time calculating section 41A executes another process of computing a high-speed travelable time by dividing the power storage amount of the battery device 19 computed at the operable-time calculating section 40 by average power consumption per unit time during high-speed travelling of the hydraulic excavator (in other words, in a case in which the electric motor 28 and the travelling hydraulic motor are being driven, and in which the displacement mode of the travelling hydraulic motor is the small-displacement mode). Note that the one process and another process mentioned before are performed in parallel.

Figure 10:
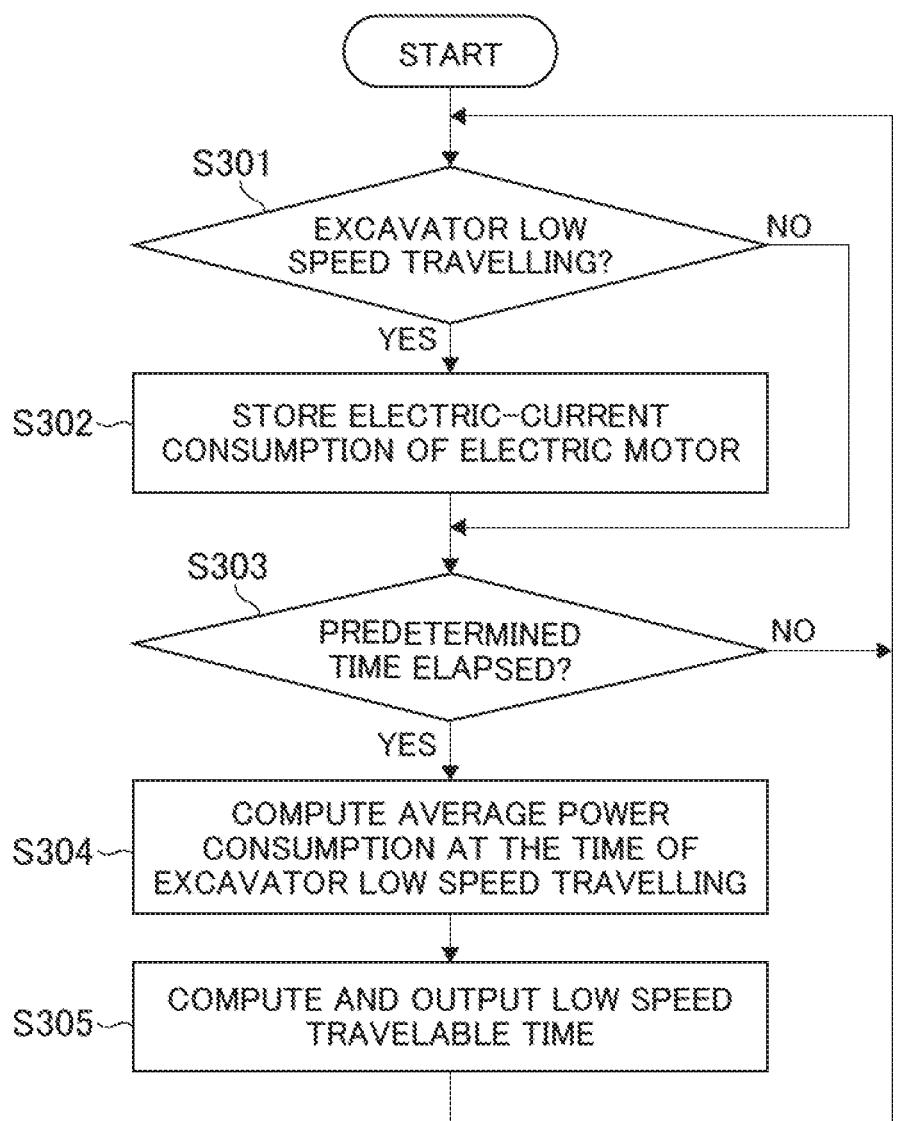
FIG. 10 is a flowchart representing one process of a travelable-time calculating section of the controller in the second embodiment of the present invention.

Next, each process of the travelable-time calculating section 41A of the controller 37A of the present embodiment is explained. FIG. 10 is a flowchart representing one process of the travelable-time calculating section of the controller in the present embodiment.

At Step S301, the travelable-time calculating section 41A of the controller 37A decides whether or not the electric motor 28 and the travelling hydraulic motor are being driven, and whether or not the displacement mode of the travelling hydraulic motor is the large-displacement mode (in other words, whether or not the hydraulic excavator is travelling at a low speed) on the basis of a result of sensing by the travelling sensor 36 and control information of the travelling-mode control section 44. In a case in which the electric motor 28 and the travelling hydraulic motor are being driven, and in which the displacement mode of the travelling hydraulic motor is the large-displacement mode (in other words, in a case in which the hydraulic excavator is travelling at a low speed), the process proceeds to Step S302, and the travelable-time calculating section 41A stores electric-current consumption of the electric motor 28 sensed at the electric-current sensor 38. That is, the travelable-time calculating section 41A stores a third history of electric-current consumption of the electric motor 28 sensed at the electric-current sensor 38 in a case in which the electric motor 28 and the travelling hydraulic motor are being driven, and in which the displacement mode of the travelling hydraulic motor is the large-displacement mode (in other words, during low-speed travelling of the hydraulic excavator). The maximum number of pieces of the stored data is set to the number of pieces of data sensed while the hydraulic excavator is travelling at a low speed for the predetermined length of time t1 (e.g. 10 minutes). The travelable-time calculating section 41A is configured to delete the oldest piece of the stored data in a case in which the number of the pieces of the stored data exceeds the maximum number.

After Step S302, the process proceeds to Step S303. At Step S301, in a case in which the travelling motor is not being driven or the displacement mode of the travelling hydraulic motor is the small-displacement mode (in other words, the hydraulic excavator is not travelling at a low speed) at Step S301, the process skips Step S302, and proceeds to Step S303. At Step S303, according to the timer, the travelable-time calculating section 41A of the controller 37A decides whether or not the predetermined length of time t2 has elapsed. If the predetermined length of time t2 has not elapsed, the travelable-time calculating section 41A continues counting with the timer, and returns to Step S301 to repeat the same procedures as those explained above. If the predetermined length of time t2 has elapsed, the travelable-time calculating section 41A resets the timer, and proceeds to Step S304.

At Step S304, the travelable-time calculating section 41A of the controller 37A computes average power consumption per unit time in a case in which the electric motor 28 and the travelling hydraulic motor are being driven, and in which the displacement mode of the travelling hydraulic motor is the large-displacement mode (in other words, during low-speed travelling of the hydraulic excavator), on the basis of the third history of the electric-current consumption mentioned above of the electric motor 28. Specifically, the travelable-time calculating section 41A computes a power consumption amount of the electric motor 28 by adding up electric-current consumption of the electric motor 28 stored as the third history. Then, the travelable-time calculating section 41A computes average power consumption per unit time in a case in which the electric motor 28 and the travelling hydraulic motor are being driven, and in which the displacement mode of the travelling hydraulic motor is the large-displacement mode (in other words, during low-speed travelling of the hydraulic excavator) by dividing the power consumption amount mentioned before by the predetermined length of time t1. Then, the process proceeds to Step S305, and the travelable-time calculating section 41A computes a low-speed travelable time by dividing the current power storage amount of the battery device 19 by the average power consumption mentioned before. The travelable-time calculating section 41A outputs the computed low-speed travelable time to the display device 24.

Figure 11:
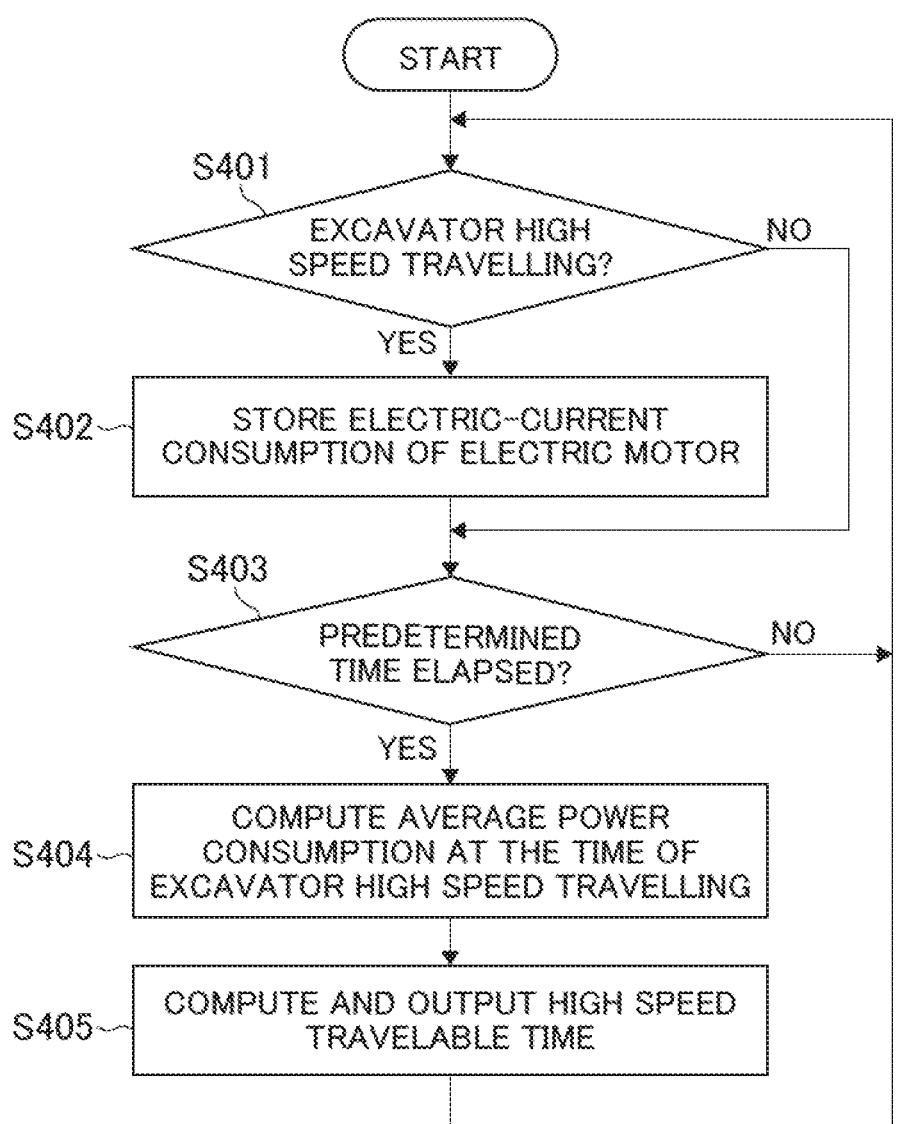
FIG. 11 is a flowchart representing another process of the travelable-time calculating section of the controller in the second embodiment of the present invention.

FIG. 11 is a flowchart representing another process of the travelable-time calculating section of the controller in the present embodiment.

At Step S401, the travelable-time calculating section 41A of the controller 37A decides whether or not the electric motor 28 and the travelling hydraulic motor are being driven, and whether or not the displacement mode of the travelling hydraulic motor is the small-displacement mode (in other words, whether or not the hydraulic excavator is travelling at a high speed), on the basis of a result of sensing by the travelling sensor 36 and control information of the travelling-mode control section 44. In a case in which the electric motor 28 and the travelling hydraulic motor are being driven, and in which the displacement mode of the travelling hydraulic motor is the small-displacement mode (in other words, in a case in which the hydraulic excavator is travelling at a high speed), the process proceeds to Step S402, and the travelable-time calculating section 41A stores electric-current consumption of the electric motor 28 sensed at the electric-current sensor 38. That is, the travelable-time calculating section 41A stores a fourth history of electric-current consumption of the electric motor 28 sensed at the electric-current sensor 38 in a case in which the electric motor 28 and the travelling hydraulic motor are being driven, and in which the displacement mode of the travelling hydraulic motor is the small-displacement mode (in other words, during high-speed travelling of the hydraulic excavator). The maximum number of pieces of the stored data is set to the number of pieces of data sensed while the hydraulic excavator is travelling at a high speed for the predetermined length of time t1 (e.g. 10 minutes). The travelable-time calculating section 41A is configured to delete the oldest piece of the stored data in a case in which the number of the pieces of the stored data exceeds the maximum number.

After Step S402, the process proceeds to Step S403. At Step S401, in a case in which the travelling hydraulic motor is not being driven or the displacement mode of the travelling hydraulic motor is the large-displacement mode (in other words, the hydraulic excavator is not travelling at a high speed), the process skips Step S402, and proceeds to Step S403. At Step S403, according to the timer, the travelable-time calculating section 41A of the controller 37A decides whether or not the predetermined length of time t2 has elapsed. If the predetermined length of time t2 has not elapsed, the travelable-time calculating section 41A continues counting with the timer, and returns to Step S401 to repeat the same procedures as those explained above. If the predetermined length of time t2 has elapsed, the travelable-time calculating section 41A resets the timer, and proceeds to Step S404.

At Step S404, the travelable-time calculating section 41A of the controller 37A computes average power consumption per unit time in a case in which the electric motor 28 and the travelling hydraulic motor are being driven, and in which the displacement mode of the travelling hydraulic motor is the small-displacement mode (in other words, during high-speed travelling of the hydraulic excavator), on the basis of the fourth history of the electric-current consumption mentioned above of the electric motor 28. Specifically, the travelable-time calculating section 41A computes a power consumption amount of the electric motor 28 by adding up electric-current consumption of the electric motor 28 stored as the fourth history. Then, the travelable-time calculating section 41A computes average power consumption per unit time in a case in which the electric motor 28 and the travelling hydraulic motor are being driven, and in which the displacement mode of the travelling hydraulic motor is the small-displacement mode (in other words, during high-speed travelling of the hydraulic excavator) by dividing the power consumption amount mentioned before by the predetermined length of time t1. Then, the process proceeds to Step S405, and the travelable-time calculating section 41A computes a high-speed travelable time by dividing the current power storage amount of the battery device 19 by the average power consumption mentioned before. The travelable-time calculating section 41A outputs the computed high-speed travelable time to the display device 24.

The controller 37A switches the screen of the display device 24, for example, as illustrated in FIG. 12 depending on an input from the travelling-mode selection switch 42. The controller 37A switches the screen to a screen 25A of the display device 24 when the low-speed travelling mode is selected at the travelling-mode selection switch 42, and causes the operable time and the low-speed travelable time to be displayed on the display device 24. The controller 37A switches the screen to a screen 25B of the display device 24 when the high-speed travelling mode is selected at the travelling-mode selection switch 42, and causes the operable time and the high-speed travelable time to be displayed on the display device 24.

In the present embodiment mentioned above also, the same action and effects as those in the first embodiment can be obtained. In addition, in the present embodiment, an operator can consider not only the timing for returning from a work location to a charging location, but also the travelling mode to select when returning from the work location to the charging location, on the basis of a plan of work at the work location, and the operable time, the high-speed travelable time and the low-speed travelable time that are displayed on the display device 24.

Note that although in the example explained in the second embodiment, the travelable-time calculating section 41A of the controller 37A computes average power consumption per unit time in a case in which the electric motor 28 and the travelling hydraulic motor are being driven, and in which the displacement mode of the travelling hydraulic motor is the large-displacement mode on the basis of the third history of electric-current consumption of the electric motor 28, and uses the average power consumption to compute a low-speed travelable time, this is not the sole example, and there can be variants within a scope not deviating from the gist and the technical idea of the present invention. For example, average power consumption per unit time in a case in which the electric motor 28 and the travelling hydraulic motor are being driven, and in which the displacement mode of the travelling hydraulic motor is the large-displacement mode may be set in advance, and the travelable-time calculating section 41A of the controller 37A may use the average power consumption to compute a low-speed travelable time.

In addition, although in the example explained in the second embodiment, the travelable-time calculating section 41A of the controller 37A computes average power consumption per unit time in a case in which the electric motor 28 and the travelling hydraulic motor are being driven, and in which the displacement mode of the travelling hydraulic motor is the small-displacement mode, on the basis of the fourth history of electric-current consumption of the electric motor 28, and uses the average power consumption to compute a high-speed travelable time, this is not the sole example, and there can be variants within a scope not deviating from the gist and the technical idea of the present invention. For example, average power consumption per unit time in a case in which the electric motor 28 and the travelling hydraulic motor are being driven, and in which the displacement mode of the travelling hydraulic motor is the small-displacement mode may be set in advance, and the travelable-time calculating section 41A of the controller 37A may use the average power consumption to compute a high-speed travelable time.

In addition, although in the example explained in the second embodiment, the controller 37A switches the screen of the display device 24 (in other words, switches the screen between a display of the operable time and the low-speed travelable time, and a display of the operable time and the high-speed travelable time) depending on an input from the travelling-mode selection switch 42, this is not the sole example, and there can be variants within a scope not deviating from the gist and the technical idea of the present invention. For example, the controller 37A may simultaneously display the operable time, the low-speed travelable time and the high-speed travelable time on the display device 24.

In addition, although in the example explained in the second embodiment, the controller 37A has the travelling-mode control section 44, this is not the sole example, and there can be variants within a scope not deviating from the gist and the technical idea of the present invention. For example, the controller 37A may not have the travelling-mode control section 44. That is, another controller having a travelling-mode control section may be provided. Alternatively, the motor-displacement controller 43 may directly receive an input of an instruction (signal) from the travelling-mode selection switch 42, and switch the mode between the large-displacement mode and the small-displacement mode depending on the instruction.

In addition, although in the examples explained in the first and second embodiments, the controller 37 or 37A has the start/stop control section 39, this is not the sole example, and there can be variants within a scope not deviating from the gist and the technical idea of the present invention. For example, the controller 37 or 37A may not have the start/stop control section 39. That is, another controller having a start/stop control section may be provided.

In addition, although in the examples explained in the first and second embodiments, the travelling sensor 36 is constituted by pilot pressure sensors and a shuttle valve, this is not the sole example, and there can be variants within a scope not deviating from the gist and the technical idea of the present invention. For example, the travelling sensor may be constituted by a speed sensor that senses the travel speed of a hydraulic excavator.

Note that although in the examples explained above, the present invention is applied to an electric hydraulic excavator, this is not the sole example, and the present invention may be applied to an electric hydraulic crane and the like.

DESCRIPTION OF REFERENCE CHARACTERS 7, 7A: Travelling hydraulic motor
14: Boom hydraulic cylinder
15: Arm hydraulic cylinder
16: Bucket hydraulic cylinder
19: Battery device (power storage device)
24: Display device
28: Electric motor
29: Hydraulic pump
37, 37A: Controller
42: Travelling-mode selection switch
43: Motor-displacement controller

The invention claimed is:

1. An electric construction machine comprising:
a power storage device;
an electric motor that is driven by power of the power storage device;
a hydraulic pump that is driven by the electric motor;
a travelling hydraulic motor and a work hydraulic actuator that are driven by a hydraulic fluid delivered from the hydraulic pump;
a controller; and
a display device, wherein
the controller is configured to:
compute an operable time by dividing a power storage amount of the power storage device by average power consumption per unit time during driving of the electric motor;
compute a travelable time by dividing the power storage amount of the power storage device by average power consumption per unit time during driving of the electric motor and the travelling hydraulic motor; and
cause the computed operable time and the computed travelable time to be displayed on the display device.

2. The electric construction machine according to claim 1, further comprising:
an electric-current sensor that senses electric-current consumption of the electric motor, wherein
the controller is configured to
store a first history of electric-current consumption of the electric motor, the electric-current consumption being sensed at the electric-current sensor during driving of the electric motor, and compute the average power consumption per unit time during driving of the electric motor on a basis of the first history of the electric-current consumption of the electric motor, and additionally
store a second history of electric-current consumption of the electric motor, the electric-current consumption being sensed at the electric-current sensor during driving of the electric motor and the travelling hydraulic motor, and compute the average power consumption per unit time during driving of the electric motor and the travelling hydraulic motor on a basis of the second history of the electric-current consumption of the electric motor.

3. The electric construction machine according to claim 1, comprising:
a travelling-mode selection switch through which an instruction to select either one of a low-speed travelling mode or a high-speed travelling mode is input; and
a motor-displacement controller that switches a displacement mode of the travelling hydraulic motor between a large-displacement mode corresponding to the low-speed travelling mode and a small-displacement mode corresponding to the high-speed travelling mode, on a basis of the instruction of the travelling-mode selection switch, wherein
the controller is configured to:
compute a low-speed travelable time by dividing the power storage amount of the power storage device by average power consumption per unit time in a case in which the electric motor and the travelling hydraulic motor are being driven, and in which the displacement mode of the travelling hydraulic motor is the large-displacement mode;
compute a high-speed travelable time by dividing the power storage amount of the power storage device by average power consumption per unit time in a case in which the electric motor and the travelling hydraulic motor are being driven, and in which the displacement mode of the travelling hydraulic motor is the small-displacement mode; and
cause the computed operable time, the computed low-speed travelable time and the computed high-speed travelable time to be displayed on the display device.

4. The electric construction machine according to claim 3, further comprising:
an electric-current sensor that senses electric-current consumption of the electric motor, wherein
the controller is configured to
store a third history of electric-current consumption of the electric motor, the electric-current consumption being sensed at the electric-current sensor in a case in which the electric motor and the travelling hydraulic motor are being driven, and in which the displacement mode of the travelling hydraulic motor is the large-displacement mode, and compute average power consumption per unit time in the case in which the electric motor and the travelling hydraulic motor are being driven, and in which the displacement mode of the travelling hydraulic motor is the large-displacement mode, on a basis of the third history of the electric-current consumption of the electric motor; and additionally store a fourth history of electric-current consumption of the electric motor, the electric-current consumption being sensed at the electric-current sensor in a case in which the electric motor and the travelling hydraulic motor are being driven, and in which the displacement mode of the travelling hydraulic motor is the small-displacement mode, and compute average power consumption per unit time in the case in which the electric motor and the travelling hydraulic motor are being driven, and in which the displacement mode of the travelling hydraulic motor is the small-displacement mode, on a basis of the fourth history of the electric-current consumption of the electric motor.

5. The electric construction machine according to claim 3, wherein
the controller is configured to cause the operable time and the low-speed travelable time to be displayed on the display device when the low-speed travelling mode is selected at the travelling-mode selection switch, and cause the operable time and the high-speed travelable time to be displayed on the display device when the high-speed travelling mode is selected at the travelling-mode selection switch.

* * * * *